UNITED STATES PATENT OFFICE.

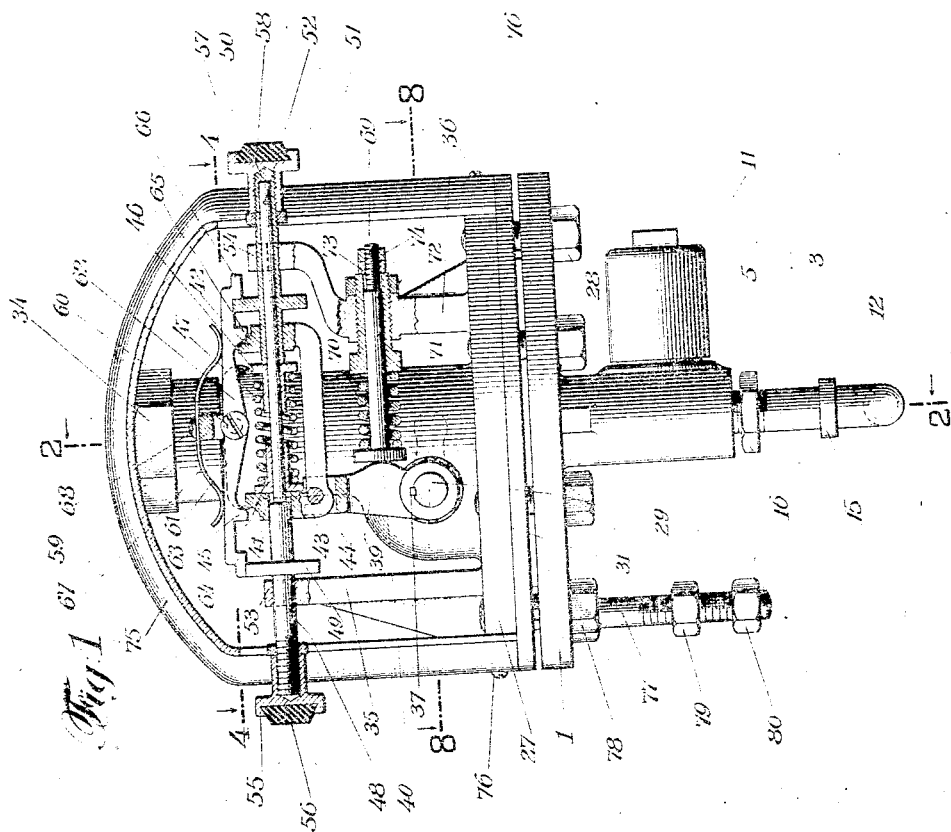

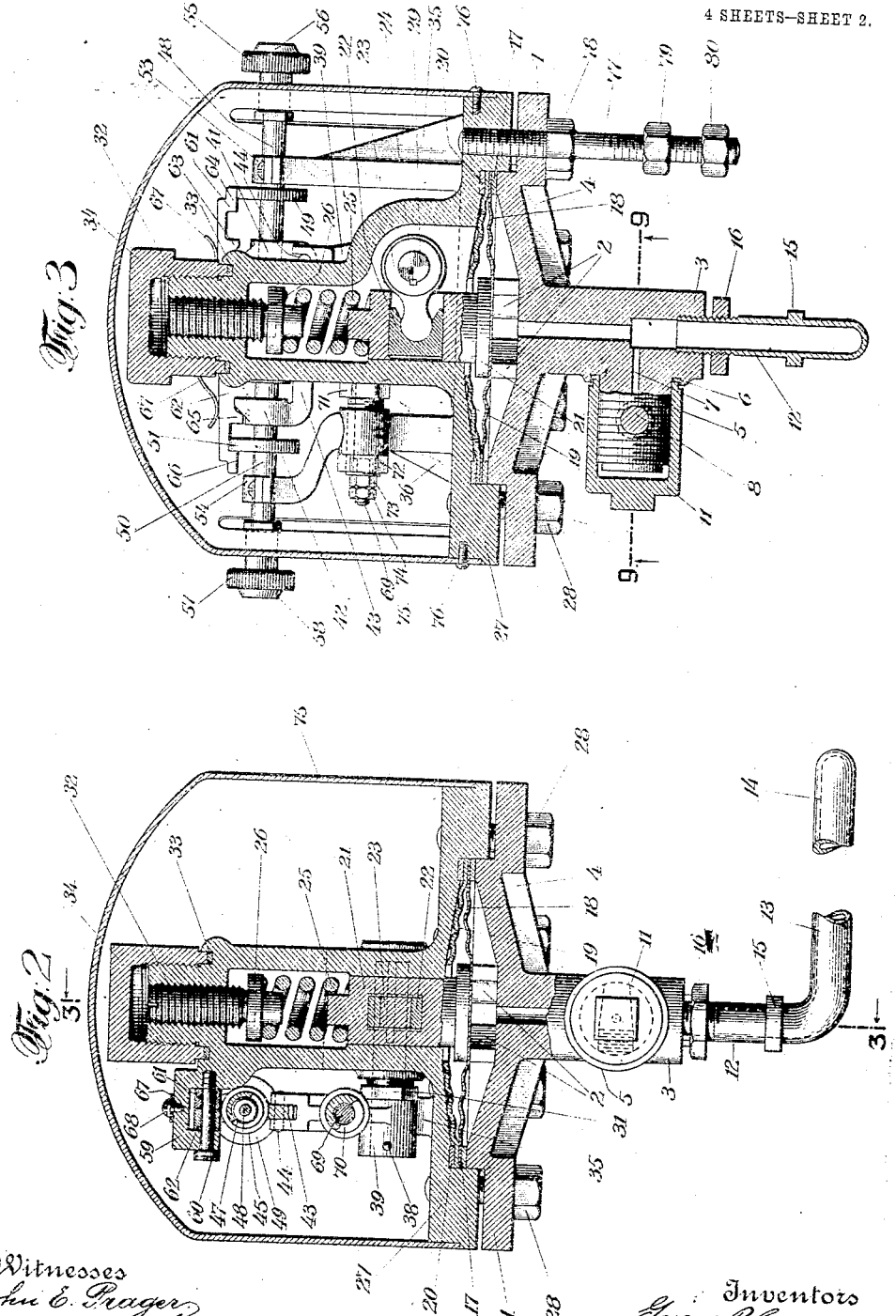

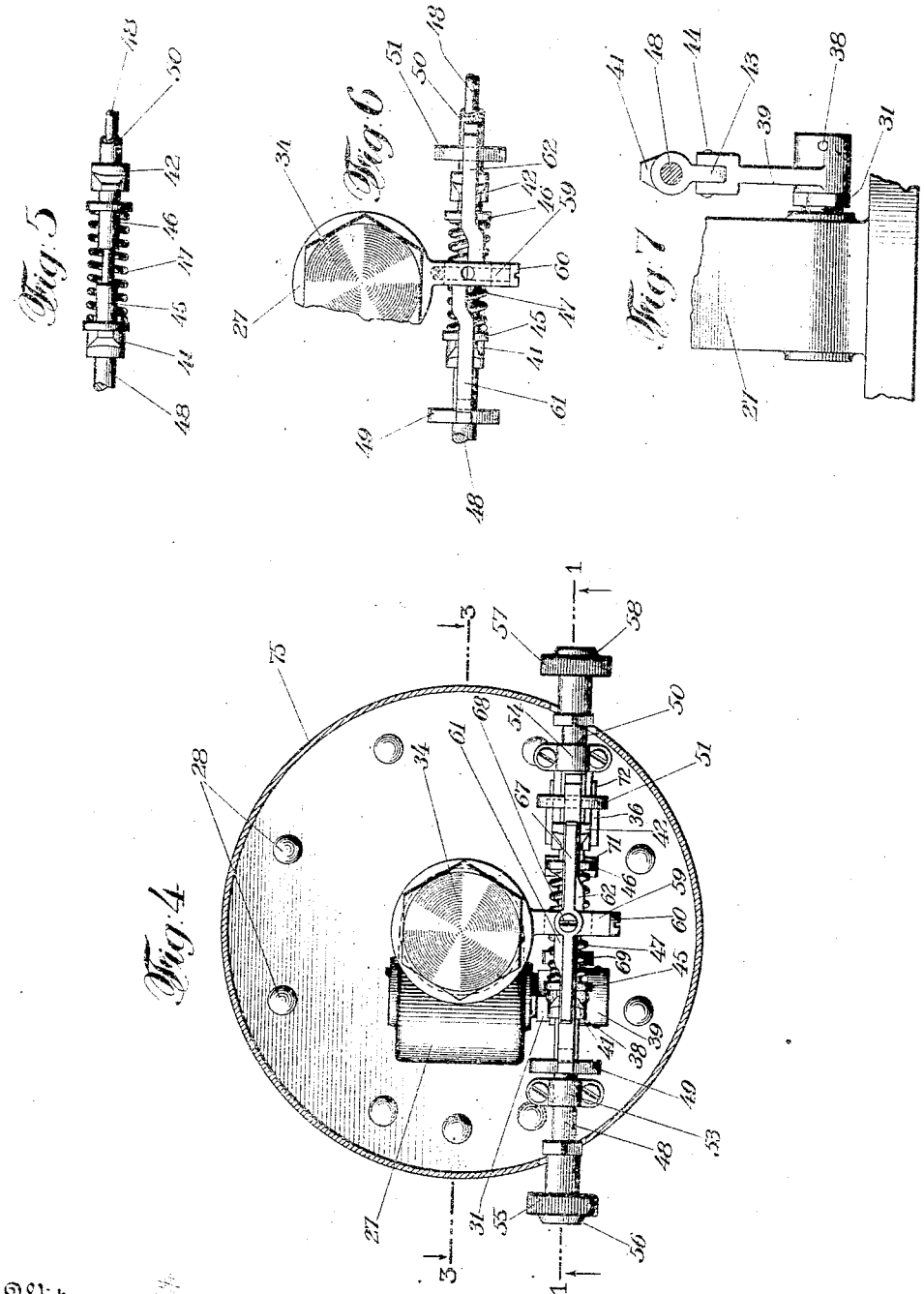

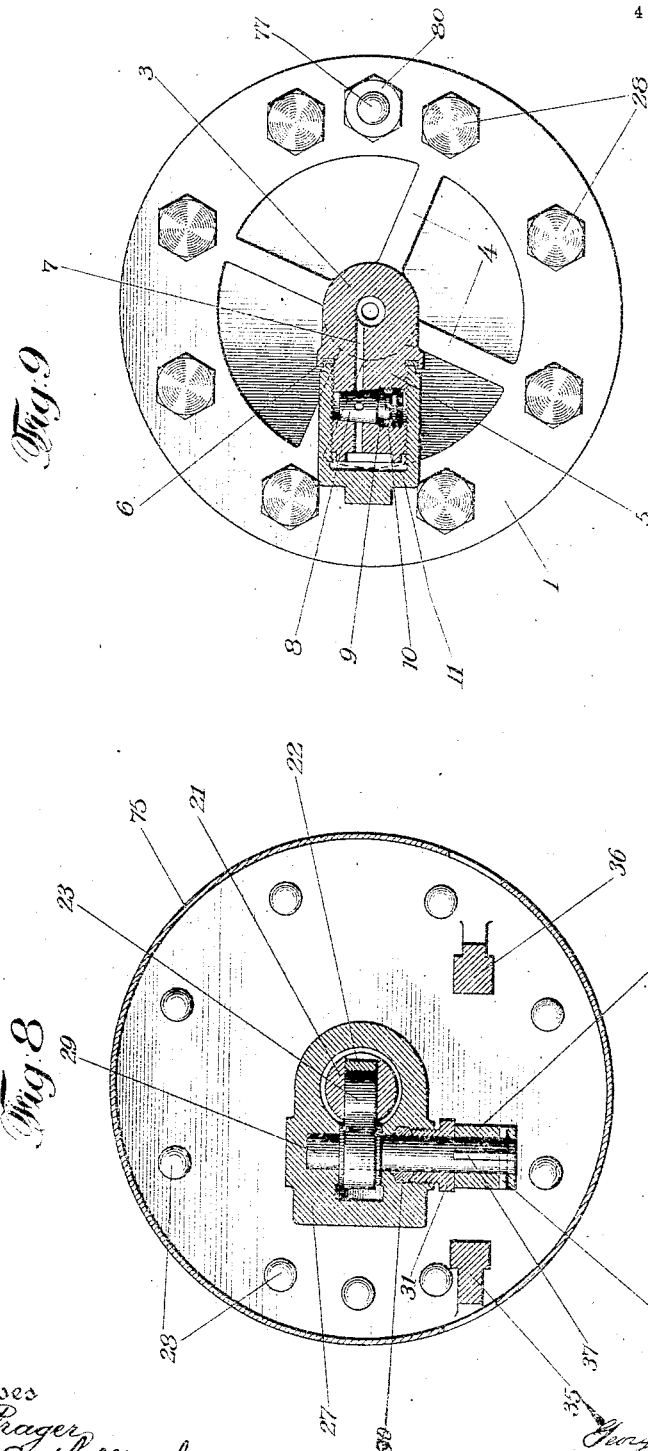

GEORGE P. CARROLL, OF BRIDGEPORT, CONNECTICUT, AND FRANK N. ROEHRICH, OF JERSEY CITY, NEW JERSEY; SAID ROEHRICH ASSIGNOR TO SAID CARROLL.

QUICK-MOTION CONTROLLER.

1,096,825.          Specification of Letters Patent.      Patented May 19, 1914.

Continuation of application Serial No. 569,530, filed June 29, 1910. This application filed December 30, 1910. Serial No. 600,091.

*To all whom it may concern:*

Be it known that we, GEORGE P. CARROLL and FRANK N. ROEHRICH, citizens of the United States, and residents, respectively, of Bridgeport, Fairfield county, State of Connecticut, and of Jersey City, Hudson county, State of New Jersey, have invented a new and useful Quick-Motion Controller, of which the following is a specification.

This application is a continuation of certain matter shown in our application filed June 29, 1910, Ser. No. 569,530, entitled Automatic condenser.

The purpose of our invention herein set forth is to construct an automatic apparatus whereby an intermediate actuating member, even if moving slowly itself, upon certain limits being reached, may transmit its motion to a motor part that will itself move quickly for the accomplishment of some ultimate movement.

Our further purpose is to accomplish these movements with certainty and accuracy.

Our further purpose is to provide means whereby such a train of mechanism may be operated by increases and decreases of pressure or by increases and decreases of temperature or by any other forces.

Our invention is especially adapted for use as a part of the controlling mechanism of an automatic absorption refrigerating machine.

In the parent application our invention is used to control an automatic condenser, but it may be used for controlling other parts of a refrigerating machine, whether of the absorption or of the compression type.

Our invention includes means for accomplishing these purposes. There are also detail improvements as will appear. The means employed are as will appear.

In the drawings Figure 1 is a partial front elevation of our invention and a partial vertical section of it through the line 1—1 of Fig. 4, looking upward. Fig. 2 is a central vertical section through the line 2—2 of Fig. 1, looking toward the left, with, however, some of the lower parts in elevation. Fig. 3 is a central vertical section through the line 3—3 of Fig. 4, looking downward and with some of the minor parts in elevation; and it is also a similar central vertical section through the line 3—3 of the preceding figure, looking toward the left. Fig. 4 is a plan view of the controller, but with its cover sectioned through the line 4—4 of Fig. 1, looking downward. Fig. 5 is a horizontal section of a motor spring and a plan view of certain adjacent parts. Fig. 6 is a plan view of said motor spring and of certain parts above and adjacent to it. Fig. 7 is a left end elevation of a lever and of certain adjacent parts. Fig. 8 is a horizontal section through the line 8—8 of Fig. 1, looking downward. Fig. 9 is a horizontal section through the line 9—9 of Fig. 3, looking upward, but with a valve and the upper adjacent non-sectioned parts shown in full.

A lower casing 1 has a depressed circumferential flange forming on top a shallow chamber and containing as parts integral with the chamber four stoppers 2, spaced away a little from the vertical center of the chamber in circular formation and with vertical slits between themselves, so as to form a broken ring at the top in the same plane as the top of the casing inside its flange. The under side of the casing 1 has a conduit projection 3 extending downward with an axial passage extending from between the stoppers 2 to the bottom of the projection, where it is enlarged and threaded. For purposes of strength, four ribs 4 extend radially from the projection 3 to the inside of the flange of the casing. Integral with the projection 3 and extending horizontally to the right is a cylindrical hub 5 of a certain diameter right near the projection and of a reduced diameter for the remainder of its length. In the face thus formed in the larger diameter of the hub 5 is an annular groove containing a gasket 6. A small passage 7 extends from the outer end of the hub 5 to the passage in the projection 3. Intercepting the passage 7 is a slightly conical opening through the hub 5 that has a cylindrical threaded enlargement in the front of the hub. In the conical part of this opening is a plug valve 8, having a transverse passage adapted to register with the passage 7 and being of reduced diameter at its outer end in front, so that it can be held in place by a gasket 9 and a slotted ring 10, which latter is screwed into the threaded enlargement of the opening. The outer end of the valve 8 within the ring 10 also has a transverse slot so that it can be opened or closed by means of a small screw driver.

No part of the valve 8 or of the ring 10 extends as far as the cylindrical surface of the hub 5. This cylindrical surface, where the hub is of reduced diameter, is threaded.

Screwed around the threaded surface of the hub 5 so as to inclose the valve 8 and the ring 10 and so as to compress the gasket 6, there forming a tight gas joint, is an internally threaded cap 11, having a square nut on its outer end.

Into the enlarged and threaded lower end of the passage of the projection 3 is screwed an open end of a tube 12. The other end of the tube 12 may be considered as open at the part 13. Or a closed end 14 may be considered as belonging to and joinable with the part 13. In the former case our invention would be adapted for simple pressure actuation. In the latter case it would be adapted for thermostatic actuation. These uses will be explained later. Near the threaded end of the tube 12 is an integral collar 15. Screwed around the threaded end of the tube 12 is a collar 16, so that by screwing the collar 16 toward the collar 15 a suitable supporting wall may be clamped. As the connection between the tube 12 and the projection 3 is to be permanent, it is made with litharge and glycerin.

Upon the edge of the top of the casing 1 within its depressed circumference, rests a gasket 17. Upon the gasket 17 rests the circumference of an imperforate somewhat flexible diaphragm 18, preferably slightly corrugated between the gasket and a circle in line with a continuation of the outside lines of the stoppers 2. Except for use with ammonia, the diaphragm 18 may be of phosphor-bronze; for use with ammonia the diaphragm may be of steel or nickel; and the diaphragm may be, according to circumstances, from 5 to 12 one-thousandths of an inch thick. When in its depressed position, as shown in Figs. 2 and 3, the diaphragm 18 rests upon the stoppers 2; and the thickness of the gasket 17 is so chosen as to properly limit the down movement of the diaphragm. Above the diaphragm 18 is a rigid annular limiting piece 19, near its circumference resting on the diaphragm and spaced more and more away therefrom toward its own annular center. This piece is corrugated so as to register with the corrugations of the diaphragm 18 and has through it quite a number of small escape holes, so that, whenever the diaphragm is forced upward, any fluid between the diaphragm and the piece can pass through the holes. In practice the piece 19 is so formed and spaced as to permit of a total movement of the diaphragm 18 at its center of about one-sixteenth to one-eighth of an inch. Over and around the circumference of the piece 19 is placed another gasket 20, similar to the gasket 17.

A foot 21 has, inside the circular opening in the piece 19 and resting upon the part of the diaphragm 18 within the corrugated part, a flanged extension with a flat under surface. About midway between the vertical extremities of the foot 21 is a rectangular opening extending through the foot from side to side. Free to reciprocate slightly in this opening is a rectangular slide block 22, having through it from back to front, in a direction transverse to that of the opening in the foot 21, a partially cylindrical opening containing the free end of an inner lever 23. The opening through the block 22 slightly exceeds half a circle, so that, after the block and the outer end of the lever 23 have been inserted into the opening in the foot 21, the lever cannot be withdrawn from the block but causes it to reciprocate slightly as the lever is correspondingly rotated. The inner end of the lever 23 has a shaft opening and a key way containing a key 24. At its top the foot 21 has a central hub of reduced diameter. Outside of the hub thus formed and resting on the foot 21 is a heavy helical compression spring 25, called the outward opposing spring. At its top the spring 25 abuts against the similar seat of a head 26, having on top a concave recess.

An upper casing 27 fits over the head 26, the spring 25, the lever 23 and the key 24, surrounds and guides the cylindrical part of the foot 21, presses down the gasket 20 and is secured to the casing 1 by eight hexagonal headed bolts 28, which pass through threaded holes in the upper and lower casings made for that purpose. The casing 27 has an extension at one side to contain the lever 23 and the key 24 and has a horizontal shaft opening with an outside threaded stuffing box recess. Inserted through this opening in the casing 27 and at its inner end journaled in the casing, passing through the opening in the lever 23 and having a key way registering with the key 24 so as to firmly lock the lever, is a rock shaft 29, having a key way also at its outside end and also a transverse pin opening. In the recess around the outer end of the shaft 29 is a packing 30, held in place by a gland nut 31. The nut 31 is screwed in rather loosely as its purpose is to prevent a rapid escape of the contained fluid in case the diaphragm 18 breaks. In the axial center of the top of the casing 27 is a threaded opening, through which in case the diaphragm 18 is of steel, a quantity of non-rusting lubricant should be poured so as to be above the block 22. Through this opening in the top of the casing 27 passes an adjusting screw 32, slotted at its exterior top so that it can be turned by a screw driver, and having a convex lower end resting in the concave recess of the head 26. Around the outside of the top of the casing 27 is an annular recess containing a gasket 33. Fitting over the top of the casing 27 and the screw 32 and threaded on to the top of the casing so as to compress the gasket 33 is a cap 34, having a hexagonal nut at its top.

Cast integral with the casing 27 is a one rod support 35 and a two rod support 36. Secured to the outside end of the shaft 29 by a key 37 in the outside key way of the shaft and by a pin 38 in the pin opening in the shaft is a vertical lever 39, having on one side a cam face 40 and having a slotted pivot fork at its top. A double end cam device has an annular forward cam ring 41 with its face toward the support 35 and a similar annular back cam ring 42 with its face toward the support 36 and has the two cam rings connected on their under sides by an integral horizontal bar 43. A pivot 44 passes through the bar 43 at its end near the cam ring 41 and rests in the slots of the fork of the lever 39. A forward sleeve head 45 has an annular head toward the cam ring 41 and an integral sleeve toward the cam ring 42. A back sleeve head 46 has an annular head toward the cam ring 42 and an integral sleeve toward the cam 41. A comparatively light helical compression motor spring 47 surrounds the sleeves of the sleeve head 45 and 46, which are some distance apart, and bears against their heads. An actuating rod 48, having a little over a third of its length of a certain diameter and the remainder of its length of a less diameter, has its part of reduced diameter inserted through the sleeve head 45, the spring 47, the sleeve head 46 and the cam ring 42, has its part of larger diameter which is threaded at its outer and forward end, adapted for reciprocation in the cam ring 41 and near its forward end resting in a semi-cylindrical reciprocating recess at the top of the support 35, and has between the support 35 and the cam ring 41 an integral collar 49. A sleeve piece 50 is slid over and surrounds the part of the rod 48 of reduced diameter for part of such length of reduced diameter, is adapted for reciprocating in the cam ring 42, has between the cam ring 42 and the support 36 an integral collar 51, near its back and rests in a semi-cylindrical reciprocating recess at the top of the support 36, is threaded at its back end, has a solid back end and is secured to the rod 48 by its solid back end and by a pin 52 which passes through the back end of the contained rod. A semi-cylindrical cap piece 53 makes a reciprocating fit over the rod 48 and is screwed to the top of the support 35. A similar semi-cylindrical cap piece 54 makes a reciprocating fit over the piece 50 and is screwed to the top of the support 36. Threaded around the forward end of the rod 48 is a motor head 55 with a hard rubber face 56; and threaded around the back end of the piece 50 is a similar motor head 57 with a hard rubber face 58.

Cast integral with the casing 27 and projecting frontward from near its top is a pivot support 59. Pivoted to the support 59 by a pin 60 is a horizontal forward arm 61 and a horizontal back arm 62. The arm 61 has a forward knuckle 63 inclined so as to be lifted by the cam ring 41 on a forward movement of the cam; and it has at its free end a forward catch 64, adapted to engage with the forward side of the collar 49, when the cam ring 41 is in its extreme back position, in such a way as to lock the collar. But when the cam ring 41 advances and lifts the knuckle 63 sufficiently, the catch 64 is also lifted, releasing the collar 49; and rests on the collar. Similarly the arm 62 has a back knuckle 65 inclined so as to be lifted by the cam ring 42 on a back movement of the cam ring; and it has at its free end a back catch 66, adapted to engage with the collar 51, when the cam ring 42 is in its extreme forward position, in such a way as to lock the collar. But when the cam ring 42 recedes and lifts the knuckle 65 sufficiently, the catch 66 is also lifted, releasing the collar 51, and rests on the collar. A light double end flat spring 67, secured at its middle by a screw 68 to the support 59, tends to depress the arms 61 and 62.

Adapted to bear against the face 40 is the head of a bolt 69, which at its opposite end is of reduced diameter and threaded. Abutting at one end against the inside of the head of the bolt 69 is a helical compression spring 70, called the inward opposing spring; at its other end the spring abuts against the outside of the head of a headed sleeve 71, surrounding the bolt 69, threaded on to the outside of its part of lesser diameter and screwed into a threaded opening in the support 36 in axial alinement with the face 40. The thrust of the spring 70 is regulated by turning the sleeve 71 in the support 36 so as to advance toward or to recede from the head of the bolt 40. The spring 70 is lighter than the spring 25. The sleeve 71 is held in any desired position by a lock nut 72 screwed around the sleeve on the outside of the support 36. The bolt 69 is free to reciprocate in the sleeve 71, increasing or diminishing the thrust of the spring 70 in so doing; but is held from going too far toward the face 40 by lock nuts 73 and 74 threaded on to the threaded end of the bolt. The bolt 69 is adjusted, by means of the nuts 73 and 74, so that its head bears against the face 40 all the time that the lever 39 is in positions corresponding to positions of the diaphragm 18 between its extreme low position and an approximate midway position; but so that its head is back and out of contact with the face all the time that the lever is in positions corresponding to positions of the diaphragm between its approximate midway position and its extreme high position. After the potential thrust or compression of the spring 70 has been adjusted by turning the sleeve 71 forward or back, the bolt 69 is adjusted as stated. A thin metal cover 75 is placed over the moving parts outside of the casing 27, has vertical slits so that it can slide over the heads 55 and 57 and is secured within a step around the bottom of the casing by small screws 76.

For the thermostatic actuation of the diaphragm 18 various expansive fluids may be employed. For use in connection with the condenser of a refrigerating machine or as a refrigerator thermostat, we prefer to use anhydrous ammonia. This is introduced before the controller is attached to the condenser or to the refrigerator. To charge the tube 12, the cap 11 is removed, the valve 8 is opened and a charging vessel is secured by a threaded connection to the hub 5. Such a vessel should contain just sufficient liquid ammonia to fill the tube 12, when in the position shown in Fig. 2, the part 14 being joined to the part 13, up to the collar 15. After the charge has been introduced the valve 8 is closed and the charging vessel is disconnected. By then placing the controller so that the passage 7 is vertical, the valve 8 can be used as a purge valve to expel the air remaining in the tube 12, the loss of ammonia being inconsequential. The valve 8 is then closed, the ring 10 is tightened and the cap 11 is firmly screwed over the hub 5 so as to compress the gasket 9. For use as a still thermostat we prefer to use ethyl chlorid. As this substance vaporizes at about 54° F., unless the charge is introduced at a temperature below the point of vaporization, the filling of the tube 12 with ethyl chlorid should be as just described. If the charge is grain alcohol, which vaporizes at about 173° F. and which is therefore only available for a range of temperature with a low limit above 173°, no such care in charging is necessary.

Besides the collar 15 and the nut 16, for securing the controller to a suitable support, we provide a bolt 77 threaded into openings in the front parts of the casings 1 and 27, between the gaskets 17 and 20 and the outer edges of the casings, held in place in the casings by a lock nut 78 bearing against the under side of the casing 1, and provided with clamping nuts 79 and 80 to supplement the collar 15 and the nut 16.

The method of operation is as follows: Where the controller is pressure actuated, as it may be when used in connection with the condenser of a refrigerating machine, the end 13 is directly connected with the chamber containing the gas so that a rise or fall of the pressure of such gas will press with greater or less force on the diaphragm 18. Where the controller is thermostatically actuated, as it may be when used in connection with such a condenser, or as a refrigerator thermostat, or as a still thermostat, the parts 14 and 13 are joined, the tube 12 is filled with an expansive fluid as has been stated, and the entire tube 12 below the collar 15 is inserted inside of the place where it is intended that a rise or fall of temperature shall affect the controller. But in either case the operation of the controller is substantially the same. First assume that the pressure of the expansive fluid on the under side of the diaphragm 18 is diminishing. Thereupon the outward opposing spring 25 begins to thrust the foot 21 downward so as to depress the diaphragm 18 downward from its extreme high position toward the position shown in Figs. 2 and 3. Naturally the thrust of the spring 25 becomes weaker the more the diaphragm 18 is depressed. As the foot 21 is forced downward, the block 22 and the outer end of the lever 23 are also depressed. This movement of the lever 23 rotates backward the shaft 29 and through it the lever 39. When the lever 39 has been rotated backward to a point approximately corresponding to the midway position of the diaphragm 18 between its extreme high and low position, the face 40 begins to bear against the head of the bolt 69 so as to compress the inward opposing spring 70. Naturally such compression becomes more intense as the lever 39 approaches the extreme back position. This backward rotation of the lever 39 also carries the pin 44 backward so as to carry backward the bar 43 and the cam rings 41 and 42. The parts are now in the positions best shown in Fig. 1. The catch 64 is now resting on the collar 49; the catch 66 is locking the collar 51; and the cam ring 42 is bearing against the knuckle 65. Finally the pressure on the under side of the diaphragm 18 reaches a predetermined low limit. The outward opposing spring 25 has thrust the foot 21 and the diaphragm 18 downward to or nearly to their lowest possible position. At this same instant the cam ring 42 has been carried so far back along the incline of the knuckle 65 that, at a critical point in the incline, the arm 62 flies up and the catch 66 releases the collar 51. Thereupon the spring 47, which meanwhile has been in process of compression by the backward movement of the cam ring 41 against the sleeve head 45, suddenly forces the sleeve head 46 against the cam ring 42 and carries the rod 48, the piece 50, the collars 49 and 51 and the head 57 an equal distance backward. Consequently, if the head 55 has been used to move any part of a train of mechanism, it now releases the part so moved; and likewise, if the head 57 is being used to move any part of a train of mechanism, it now moves such part. With the back movement of the rod 48 and the piece 50, the arm 61, forced down by the spring 67 and by gravity, by means of the catch 64 locks the collar 49 and has its knuckle 63 resting on and in front of the cam ring 41. At the same time the catch 66 rests on the collar 51 and the knuckle 65 is above and out of contact with the cam ring 42. All parts are now at rest and so continue until the pressure on the underside of the diaphragm 18 begins to increase. Is is to be noted that in this inward half of the cycle of operation the thrust of the spring 25 overcomes the counter thrust of the weaker spring 70 because of the diminishing pressure on the under side of the diaphragm 18; that the spring 25 simply supplies force to compress the spring 70; that the critical limit at which the rod 48 and the piece 50 spring back is determined solely by the intensity of the compression of the spring 70; and that the extent of such compression is regulated so that the spring back of the rod and the piece shall occur when the pressure on the under side of the diaphragm 18 reaches its predetermined low limit. To lower the limit at which the spring back shall occur, the potential compression of the spring 70 is lessened; and to raise such limit, such potential compression is increased. A turning of the sleeve 71 backward tends to relieve the spring 70; and a turning of the sleeve frontward increases the compression of the spring. Now assume that the pressure of the expansive fluid on the under side of the diaphragm 18 begins to rise toward a predetermined high limit. Thereupon such pressure, assisted by the inward opposing spring 70, begins to force the foot 21 and the outward opposing spring 25 toward their extreme high position. Consequently, the block 22 and the outer end of the lever 23 are correspondingly lifted. This movement of the lever 23 rotates frontward the shaft 29 and through it the lever 39. This frontward rotation of the lever 39 causes its face 40 to recede away from the head of the bolt 69 so as to allow the spring 70 to expand. When the lever 39 has rotated frontward to a point approximately corresponding to the midway position of the diaphragm 18, the bolt 69 no longer follows the face 40, being held back by the adjustment of the sleeve 71. Consequently, the spring 70 is not a factor in determining or in regulating the high operating limit. But the frontward rotation of the lever 39, both before and after the face 40 leaves the bolt 69, carries the pin 44 frontward so as to carry frontward the bar 43 and the cam rings 41 and 42. Now suddenly, the cam ring 41 being at the critical point on the incline of the knuckle 63, the arm 61 flies up and the catch 64 releases the collar 49. Thereupon the spring 47, which meanwhile has been in process of compression by the frontward movement of the cam ring 42 against the sleeve head 46, suddenly forces the sleeve head 45 against the part of the rod 48 of larger diameter and carries the rod, the piece 50, the collars 49 and 51 and the head 55 an equal distance frontward. Consequently, if the head 57 has been used to move any part of a train of mechanism, it now releases the part so moved; and likewise, if the head 55 is being used to move any part of a train of mechanism, it now moves such part. With the front movement of the rod 48 and the piece 50, the arm 62, forced down by the spring 67 and by gravity, by means of the catch 66 locks the collar 51 and has its knuckle 65 resting on and in back of the cam ring 62. At the same time the catch 64 rests on the collar 49 and the knuckle 63 is above and out of contact with the cam ring 41. The cycle of operation is now complete and the parts are as best shown in Fig. 1. It is to be noted that in this outward half of the cycle of operation the maximum compression of the spring 25 alone determines the critical limit at which the rod 48 and the piece 50 spring forward; and that the extent of such compression is regulated so that the spring forward of the rod and the piece shall occur when the pressure on the under side of the diaphragm 18 reaches a predetermined high limit. To raise the limit at which the spring forward shall occur, the potential compression of the spring 25 is increased; and to lower such limit, such potential compression is lessened. Obviously a turning of the screw 32 downward, after the cap 34 has been temporarily removed, increases the compression of the spring 25, and a turning of the screw upward tends to relieve the spring. The spring 70 is adjusted after the adjustment of the spring 25 has been made.

It may be thought that the spring 70 might be dispensed with; and that an accurate adjustment could be made by means of the spring 25, so as to give the desired frontward and backward movements of the rod 48 and the piece 50. But such is not the fact. A single spring, such as the spring 25, can be compressed so that at one certain point it will have a certain thrusting force. But it is well nigh impossible to regulate such a spring so that it will have two predetermined thrusting forces at two points of its compression. Conditions vary with different springs that are apparently alike. Furthermore, with only one spring such as 25, there would be no means of varying the back limit. But by using the additional inward opposing spring 70, the back limit can be varied at will. It is also to be noted that in its movements of the heads 55 and 57 the controller exerts a quickness of action that is comparable to that of an electric device, without, however, having any of the disadvantages that are attendant upon the use of electromagnets and solenoids. And finally it is to be noted that the diaphragm 18, in moving the foot 21 outward and in permitting it to be moved inward, is simply an intermediate actuating member that is typical of a large number of actuating members of different kinds; and that any kind of actuating member, by first moving the foot 21 outward and then by permitting it to be moved inward, will cause the movements of the heads 55 and 57 as described. But in such case, of course, all the parts below the present diaphragm 18 would be superseded.

Within the meaning of the claims, and without excluding other forms of construction, the parts 21, 22, 23, 24, 29, 37, 38 and 39 are sufficient to constitute one form of a central device; the parts 69, 70, 71, 72, 73 and 74 are sufficient to constitute one form of an adjustable weak helical compression spring; the part 18 is sufficient to constitute one form of means for applying force to move said central device forward; the parts 48, 49, 50 and 51 are sufficient to constitute one form of a movable member with transverse projections and shoulders; the parts 59, 60, 61, 62, 63, 64, 65, 66, 67 and 68 are sufficient to constitute one form of a locking device with catches and faces; the part of the cam ring 4 above said movable member is sufficient to constitute one form of a forward cam; the part of the cam ring 42 above said movable member is sufficient to constitute one form of a back cam; the parts 45, 46 and 47 are sufficient to constitute one form of a spring device; the parts of said cam rings below said cams, as thus defined, and the part 43 are sufficient to constitute one form of means for energizing or compressing said spring device and for moving said cams; the parts 61, 63 and 64 are sufficient to constitute one form of a pivoted forward member; the parts 62, 65 and 66 are sufficient to constitute one form of a pivoted back member; and the part 18 is sufficient to constitute one form of an actuating member.

What we have invented and what we desire to have protected by Letters Patent is expressed in claims as follows:

We claim:

1. In combination with a central device, a strong spring tending to move said device back, a headed bolt with the outside of its head in the path of said device during the final part of such a movement, a weak helical compression spring surrounding said bolt and abutting the inside of its head, a headed sleeve surrounding said bolt with its head abutting said weak spring, means supporting said sleeve and permitting its longitudinal adjustment, means preventing said bolt from following said device during the final part of a forward movement of the device, and means for applying force to move said device forward in opposition to said strong spring and then for releasing them.

2. In combination a central device, a strong spring tending to move said device back, a bracket with a threaded opening, an outwardly threaded sleeve threaded within said opening and having a head toward said device, a weak helical compression spring abutting the outside of said head, a headed bolt passing through said weak spring and said sleeve and having the inside of its head abutting said weak spring and the outside of its head toward said device, means for locking said sleeve in its longitudinal positions in said bracket, means limiting the maximum movement of said bolt toward said device, and means for applying force to move said device forward in opposition to said strong spring and then for releasing them.

3. In combination a central device, a strong helical compression spring tending to move said device back, a headed bolt with the outside of its head in the path of said device during the final part of such a movement, a weak helical compression spring surrounding said bolt and abutting the inside of said head, a headed sleeve surrounding said bolt with its head abutting said weak spring, means supporting said sleeve and permitting its longitudinal adjustment, means preventing said bolt from following said device during the final part of a forward movement of the device, and means for applying force to move said device forward and to compress said strong spring and then for releasing them.

4. In combination a central device, a strong helical compression spring tending to move said device back, a bracket with a threaded opening, an outwardly threaded sleeve threaded within said opening and having a head toward said device, a weak helical compression spring abutting the outside of said head, a headed bolt passing through said weak spring and said sleeve and having the inside of its head abutting said weak spring and the outside of its head toward said device, means for locking said sleeve in its longitudinal position in said bracket, means limiting the maximum movement of said bolt toward said device, and means for applying force to move said device forward and to compress said strong spring and then for releasing them.

5. In combination a central device, a strong spring tending to move said device back, a headed bolt with the outside of its head in the path of said device during the final part of such a movement, a weak helical compression spring surrounding said bolt and abutting the inside of its head, a headed sleeve surrounding said bolt with its head abutting said weak spring, means supporting said sleeve and permitting its longitudinal adjustment, means preventing said bolt from following said device during the final part of a forward movement of the device, and a chamber having a movable wall moving said device forward in opposition to said strong spring with an increase of pressure within the chamber and yielding to the device with a decrease of such pressure.

6. In combination a central device, a strong spring tending to move said device back, a bracket with a threaded opening, an outwardly threaded sleeve threaded within said opening and having a head toward said device, a weak helical compression spring abutting the outside of said head, a headed bolt passing through said weak spring and said sleeve and having the inside of its head abutting said weak spring and the outside of its head toward said device, means for locking said sleeve in its longitudinal position in said bracket, means limiting the maximum movement of said bolt toward said device, and a chamber having a movable wall moving said device forward in opposition to said strong spring with an increase of pressure within the chamber and yielding to the device with a decrease of such pressure.

7. In combination a central device, a strong helical compression spring tending to move said device back, a headed bolt with the outside of its head in the path of said device during the final part of such a movement, a weak helical compression spring surrounding said bolt and abutting the inside of said head, a headed sleeve surrounding said bolt with its head abutting said weak spring, means supporting said sleeve and permitting its longitudinal adjustment, means preventing said bolt from following said device during the final part of a forward movement of the device, and a chamber having a movable wall moving said device forward in opposition to said strong spring with an increase of pressure within the chamber and yielding to the device with a decrease of such pressure.

8. In combination a central device, a strong helical compression spring tending to move said device back, a bracket with a threaded opening, an outwardly threaded sleeve threaded within said opening and having a head toward said device, a weak helical compression spring abutting the outside of said head, a headed bolt passing through said weak spring and said sleeve and having the inside of its head abutting said weak spring and the outside of its head toward said device, means for locking said sleeve in its longitudinal position in said bracket, means limiting the maximum movement of said bolt toward said device, and a chamber having a movable wall moving said device forward in opposition to said strong spring with an increase of pressure within the chamber and yielding to the device with a decrease of such pressure.

9. In combination a movable member having a transverse projection, a locking device having a catch locking said projection on a forward movement of said member and in front of the catch a face on its side toward said member, a cam on being moved back operating on said face so as to unlock said catch from said projection, a spring device entirely in front of the back end of said member and when energized and upon such unlocking operating on the member to cause it to spring back free of said catch, and means for energizing said spring device and so moving said cam and then for moving said cam and member forward.

10. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a spring device when energized and upon such back unlocking operating to cause said member to spring back free of said back catch and when energized and upon such forward unlocking operating to cause said member to spring forward free of said forward catch, and means for energizing said spring device and so moving said back cam and then for energizing said spring device and so moving said forward cam.

11. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam between said device and said member and on being moved forward operating on said forward face so as to unlock said forward catch from said forward projection, a back cam between said device and said member and on being moved back operating on said back face so as to unlock said back catch from said back projection, a spring device when energized and upon such back unlocking operating to cause said member to spring back free of said back catch and when energized and upon such forward unlocking operating to cause said member to spring forward free of said forward catch, and means for energizing said spring device and so moving said back cam and then for energizing said spring device and so moving said forward cam.

12. In combination a movable member having a transverse projection and a shoulder in front of the projection, a locking device having a catch locking said projection on a forward movement of said member and in front of the catch a face on its side toward said shoulder, a cam between said device and said shoulder and on being moved back operating on said face so as to unlock said catch from said projection, a spring device when energized and upon such unlocking operating on said shoulder to cause said member to spring back free of said catch, and means for energizing said spring device and so moving said cam and then for moving said cam and member forward.

13. In combination a movable member having a transverse forward projection, a transverse back projection, a forward shoulder back of the forward projection and a back shoulder in front of the back projection, a locking device having a forward catch locking said forward projection on a back movement of said member, having a back catch locking said back projection on a forward movement of said member, having back of the forward catch a forward face on its side toward said forward shoulder and having in front of the back catch a back face on its side toward said back shoulder, a forward cam between said device and said forward shoulder and on being moved forward operating on said forward face so as to unlock said forward catch from said forward projection, a back cam between said device and said back shoulder and on being moved back operating on said back face so as to unlock said back catch from said back projection, a spring device when energized and upon said back unlocking operating on said back shoulder to cause said movable member to spring back free of said back catch and when energized and upon such forward unlocking operating on said forward shoulder to cause said movable member to spring forward free of said forward catch, and means for energizing said spring device and so moving said back cam and then for energizing said spring device and so moving said forward cam.

14. In combination a movable member having a transverse projection, a locking device having a catch locking said projection on a forward movement of said member and in front of the catch a face on its side toward said member, a cam between said device and said member and on being moved back operating on said face so as to unlock said catch from said projection, a compression spring device operating when compressed and upon such unlocking to cause said member to spring back free of said catch, and means for compressing said spring device and so moving said cam and then for moving said cam and member forward.

15. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam between said device and said member and on being moved forward operating on said forward face so as to unlock said forward catch from said forward projection, a back cam between said device and said member and on being moved back operating on said back face so as to unlock said back catch from said back projection, a compression spring device when compressed and upon such back unlocking operating to cause said member to spring back free of said back catch and when compressed and upon such forward unlocking operating to cause said member to spring forward free of said forward catch, and means for compressing said spring device and so moving said back cam and then for compressing said spring device and so moving said forward cam.

16. In combination a movable member having a transverse projection and a shoulder in front of the projection, a locking device having a catch locking said projection on a forward movement of said member and in front of the catch a face on its side toward said shoulder, a cam between said device and said shoulder and on being moved back operating on said face so as to unlock said catch from said projection, a compression spring device when compressed and upon such unlocking operating on said shoulder to cause said member to spring back free of said catch, and means for compressing said spring device and so moving said cam and then for moving said cam and member forward.

17. In combination a movable member having a transverse forward projection, a transverse back projection, a forward shoulder back of the forward projection and a back shoulder in front of the back projection, a locking device having a forward catch locking said forward projection on a back movement of said member, having a back catch locking said back projection on a forward movement of said member, having back of the forward catch a forward face on its side toward said forward shoulder and having in front of the back catch a back face on its side toward said back shoulder, a forward cam between said device and said forward shoulder and on being moved forward operating on said forward face so as to unlock said forward catch from said forward projection, a back cam between said device and said back shoulder and on being moved back operating on said back face so as to unlock said back catch from said back projection, a compression spring device when compressed and upon such back unlocking operating on said back shoulder to cause said movable member to spring back free of said back catch and when compressed and upon such forward unlocking operating on said forward shoulder to cause said movable member to spring forward free of said forward catch, and means for compressing said spring device and so moving said back cam and then for compressing said spring device and so moving said forward cam.

18. In combination a movable member having a transverse projection, a pivoted member having toward its free end a face on its side toward said movable member and at its free end a catch for locking said projection, means causing said catch to lock said projection on a forward movement of said movable member, a cam between said pivoted member and said movable member and on being moved back operating on said face so as to unlock said catch from said projection, a spring device operating when energized and upon such unlocking to cause said movable member to spring back free of said catch, and means for energizing said device and so moving said cam and then for moving said cam and movable member forward.

19. In combination a movable member having a transverse forward projection and a transverse back projection, a pivoted forward member having toward its forward free end a forward face on its side toward said movable member and at its forward end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam between said forward member and said movable member and on being moved forward operating on said forward face so as to unlock said forward catch from said forward projection, a back cam between said back member and said movable member and on being moved back operating on said back face so as to unlock said back catch from said back projection, a spring device when energized and upon such back unlocking operating to cause said movable member to spring back free of said back catch and when energized and upon such forward unlocking operating to cause said movable member to spring forward free of said forward catch, and means for energizing said device and so moving said back cam and then for energizing said device and so moving said forward cam.

20. In combination a movable member having a transverse projection and a shoulder in front of the projection, a pivoted member having toward its free end a face on its side toward said shoulder and at its free end a catch for locking said projection, means causing said catch to lock said projection on a forward movement of said movable member, a cam between said pivoted member and said shoulder and on being moved back operating on said face so as to unlock said catch from said projection, a spring device when energized and upon such unlocking operating on said shoulder to cause said movable member to spring back free of such catch, and means for energizing said device and so moving said cam and then for moving said cam and movable member forward.

21. In combination a movable member having a transverse forward projection, a transverse back projection, a forward shoulder back of the forward projection and a back shoulder in front of the back projection, a pivoted forward member having toward its forward free end a forward face on its side toward said forward shoulder and at its forward end a forward catch for locking said forward projection, a pivoted back member having toward its back free end a back face on its side toward said back shoulder and at its back end a back catch for locking said back projection, means causing said forward catch to lock said forward projection on a back movement of said movable member and said back catch to lock said back projection on a forward movement of said movable member, a forward cam between said forward member and said forward shoulder and on being moved forward operating on said forward face so as to unlock said forward catch from said forward projection, a back cam between said back member and said back shoulder and on being moved back operating on said back face so as to unlock said back catch from said back projection, a spring device when energized and upon such back unlocking operating on said back shoulder to cause said movable member to spring back free of said back catch and when energized and upon such forward unlocking operating on said forward shoulder to cause said movable member to spring forward free of said forward catch, and means for energizing said device and so moving said back cam and then for energizing said device and so moving said forward cam.

22. In combination a movable member having a transverse projection, a pivoted member having toward its free end a face on its side toward said movable member and at its free end a catch for locking said projection, means causing said catch to lock said projection on a forward movement of said movable member, a cam between said pivoted member and said movable member and on being moved back operating on said face so as to unlock said catch from said projection, a compression spring device operating when compressed and upon such unlocking to cause said movable member to spring back free of said catch, and means for compressing said device and so moving said cam and then for moving said cam and movable member forward.

23. In combination a movable member having a transverse forward projection and a transverse back projection, a pivoted forward member having toward its forward free end a forward face on its side toward said movable member and at its forward free end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam between said forward member and said movable member and on being moved forward operating on said forward face so as to unlock said forward catch from said forward projection, a back cam between said back member and said movable member and on being moved back operating on said back face so as to unlock said back catch from said back projection, a compression spring device when compressed and upon such back unlocking operating to cause said movable member to spring back free of said back catch and when compressed and upon such forward unlocking operating to cause said movable member to spring forward free of said forward catch, and means for compressing said device and so moving said back cam and then for compressing said device and so moving said forward cam.

24. In combination a movable member having a transverse projection and a shoulder in front of the projection, a pivoted member having toward its free end a face on its side toward said shoulder and at its free end a catch for locking said projection, means causing said catch to lock said projection on the forward movement of said movable member, a cam between said pivoted member and said shoulder and on being moved back operating on said face so as to unlock said catch from said projection, a compression spring device when compressed and upon such unlocking operating on said shoulder to cause said movable member to spring back free of said catch, and means for compressing said device and so moving said cam and then for moving said cam and movable member forward.

25. In combination a movable member having a transverse forward projection, a transverse back projection, a forward shoulder back of the forward projection and a back shoulder in front of the back projection, a pivoted forward member having toward its forward free end a forward face on its side toward said forward shoulder and at its forward end a forward catch for locking said forward projection, a pivoted back member having toward its back free end a back face on its side toward said back shoulder and at its back end a back catch for locking said back projection, means causing said forward catch to lock said forward projection on a back movement of said movable member and said back catch to lock said back projection on a forward movement of said movable member, a forward cam between said forward member and said forward shoulder and on being moved forward operating on said forward face so as to unlock said forward catch from said forward projection, a back cam between said back member and said back shoulder and on being moved back operating on said back face so as to unlock said back catch from said back projection, a compression spring device when compressed and upon such back unlocking operating on said back shoulder to cause said movable member to spring back free of said back catch and when compressed and upon such forward unlocking operating on said forward shoulder to cause said movable member to spring forward free of said forward catch, and means for compressing said device and so moving said back cam and then for compressing said device and so moving said forward cam.

26. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a spring device when energized and upon such back unlocking operating to cause said member to spring back free of said back catch and when energized and upon such forward unlocking operating to cause said member to spring forward free of said forward catch, and means for energizing said spring device and so moving said back cam and then for energizing said spring device and so moving said forward cam.

27. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a compression spring device when compressed and upon such back unlocking operating to cause said member to spring back free of said back catch and when compressed and upon such forward unlocking operating to cause said member to spring forward free of said forward catch, and means for compressing said spring device and so moving said back cam and then for compressing said spring device and so moving said forward cam.

28. In combination a movable member having a transverse forward projection and a transverse back projection, a pivoted forward member having toward its forward end a forward face on its side toward said movable member and at its forward end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam on being moved forward operating on said forward face so as to unlock said forward catch from said forward projection, a back cam on being moved back operating on said back face so as to unlock said back catch from said back projection, a spring device when energized and upon such back unlocking operating to cause said movable member to spring back free of said back catch and when energized and upon such forward unlocking operating to cause said movable member to spring forward free of said forward catch, and means for energizing said device and so moving said back cam and then for energizing said device and so moving said forward cam.

29. In combination a movable member having a transverse forward projection and a transverse back projection, a pivoted forward member having toward its forward end a forward face on its side toward said movable member and at its forward end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam on being moved forward operating on said forward face so as to unlock said forward catch from said forward projection, a back cam on being moved back operating on said back face so as to unlock said back catch from said back projection, a compression spring device when compressed and upon such back unlocking operating to cause said movable member to spring back free of said back catch and when compressed and upon such forward unlocking operating to cause said movable member to spring forward free of said forward catch, and means for compressing said device and so moving said back cam and then for compressing said device and so moving said forward cam.

30. In combination a movable member having a transverse projection and a section of reduced diameter, a locking device having a catch locking said projection on a forward movement of said member and in front of the catch a face on its side toward said member, a cam on being moved back operating on said face so as to unlock said catch from said projection, a sleeve head surrounding said section in front of said cam, a helical compression motor spring surrounding said section and bearing against said head, and means for compressing said spring against said head and for so moving said cam and then for relieving said spring and moving said cam and member forward.

31. In combination a movable member having a transverse forward projection, a transverse back projection and a central section of reduced diameter, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a forward sleeve head surrounding said section back of said forward cam, a back sleeve head surrounding said section in front of said cam, a helical compression motor spring surrounding said section and bearing against said heads, and means for moving said cams back and forward successively.

32. In combination a movable member having a transverse projection and a section of reduced diameter, a pivoted member having toward its free end a face on its side toward said member and at its free end a catch for locking said projection, means causing said catch to lock said projection on a forward movement of said movable member, a cam on being moved back operating on said face so as to unlock said catch from said projection, a sleeve head surrounding said section in front of said cam, a helical compression motor spring surrounding said section and bearing against said head, and means for compressing said spring against said head and for so moving said cam and then for relieving said spring and moving said cam and movable member forward.

33. In combination a movable member having a transverse forward projection, a transverse back projection and a central section of reduced diameter, a pivoted forward member having toward its forward free end a forward face on its side toward said movable member and at its forward free end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam on being moved forward operating on said forward face so as to unlock said forward catch from said forward projection, a back cam on being moved back operating on said back face so as to unlock said back catch from said back projection, a forward sleeve head surrounding said section back of said forward cam, a back sleeve head surrounding said section in front of said back cam, a helical compression motor spring surrounding said section and bearing against said heads, and means for moving said cams back and forward successively.

34. In combination a movable member having a transverse forward projection, a transverse back projection and a central section of reduced diameter, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a forward sleeve head surrounding said section back of said forward cam, a back sleeve head surrounding said section in front of said back cam, a helical compression motor spring surrounding said section and bearing against said heads, an actuating member, and means operating when said actuating member moves a predetermined distance in one direction to move said cams back and when said actuating member moves a predetermined distance in the reverse directions to move said cams forward.

35. In combination a movable member having a transverse forward projection, a transverse back projection and a central section of reduced diameter, a pivoted forward member having toward its forward free end a forward face on its side toward said movable member and at its forward free end a forward catch for locking said forward projection, a pivoted back member having toward its back free end a back face on its side toward said movable member and at its back free end a back catch for locking said back projection, means causing said forward catch to lock said forward projection on a back movement of said movable member and said back catch to lock said back projection on a forward movement of said movable member, a forward cam on being moved forward operating on said forward face so as to unlock said forward catch from said forward projection, a back cam on being moved back operating on said back face so as to unlock said back catch from said back projection, a forward sleeve head surrounding said section back of said forward cam, a back sleeve head surrounding said section in front of said back cam, a helical compression motor spring surrounding said section and bearing against said heads, an actuating member, and means operating when said actuating member moves a predetermined distance in one direction to move said cams back and when said actuating member moves a predetermined distance in the reverse direction to move said cams forward.

36. In combination a chamber having a movable wall, a foot upon the outside of said wall and having a transverse recess, a slide block in said recess, a spring at one end pressing said foot against said wall, means bearing upon the other end of said spring, a rock shaft mounted near said chamber, a lever secured to said shaft and so secured to said slide block that a reciprocating movement of said foot rotates said shaft through the lever, a movable member, and means connecting said shaft and said member whereby a forward rotation of said shaft consequent upon an increase of pressure within said chamber and in opposition to said spring moves said member forward and a back rotation of said shaft consequent upon a decrease of such pressure and the action of said spring moves said member back.

37. In combination a chamber having a movable wall, a foot upon the outside of said wall and having a recess from back to front, a slide block in said recess having a more than semi-cylindrical recess from side to side, a spring at one end pressing said foot against said wall, means bearing upon the other end of said spring, a rock shaft mounted near said chamber, a lever secured to said shaft and having a more than semi-cylindrical free end occupying said more than semi-cylindrical recess, a movable member, and means connecting said shaft and said member whereby a forward rotation of said shaft consequent upon an increase of pressure within said chamber and in opposition to said spring moves said member forward and a back rotation of said shaft consequent upon a decrease of such pressure and the action of said spring moves said member back.

38. In combination a chamber having a movable wall, a foot upon the outside of said wall and having a transverse recess, a slide block in said recess, a spring pressing said foot against said wall, a casing inclosing said spring, foot and slide block and covering said wall, a rock shaft piercing said casing, an inner lever secured to the inner end of said shaft and so secured to said slide block that a reciprocating movement of said foot rotates said shaft through the lever, a movable member, and means connecting the outer end of said shaft and said member whereby a forward rotation of said shaft consequent upon an increase of pressure within said chamber and in opposition to said spring moves said member forward and a back rotation of said shaft consequent upon a decrease of such pressure and the action of said spring moves said member back.

39. In combination a chamber having a movable wall, a foot upon the outside of said wall and having a recess from back to front, a slide block in said recess having a more than semi-cylindrical recess from side to side, a spring pressing said foot against said wall, a casing inclosing said spring, foot and slide block and covering said wall, a rock shaft piercing said casing, an inner lever secured to the inner end of said shaft and having a more than semi-cylindrical free end occupying said more than semi-cylindrical recess, a movable member, and means connecting the outer end of said shaft and said member whereby a forward rotation of said shaft consequent upon an increase of pressure within said chamber and in opposition to said spring moves said member forward and a back rotation of said shaft consequent upon a decrease of such pressure and the action of said spring moves said member back.

40. In combination a movable member having a catch locking said projection on a forward movement of said member and in front of the catch a face on its side toward said member, a cam on being moved back operating on said face so as to unlock said catch from said projection, a chamber having a movable wall, and means operating when said wall moves a predetermined distance in one direction to move said cam back and upon such unlocking to move said member back free of said catch and when said wall moves a predetermined distance in the reverse direction to move said cam and member forward.

41. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a chamber having a movable wall, and means operating when said wall moves a predetermined distance in one direction to move said cams back and upon such back unlocking to move said member back free of said back catch and when said wall moves a predetermined distance in the reverse direction to move said cams forward and upon such forward unlocking to move said member forward free of said forward catch.

42. In combination a movable member having a transverse projection, a locking device having a catch locking said projection on a forward movement of said member and in front of the catch a face on its side toward said member, a cam on being moved back operating on said face so as to unlock said catch from said projection, a spring device operating when energized and upon such unlocking to cause said member to spring back free of said catch, a chamber having a movable wall, and means operating when said wall moves a predetermined distance in one direction to energize said spring device and to move said cam back and when said wall moves a predetermined distance in the reverse direction to move said cam and member forward.

43. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a spring device when energized and upon such back unlocking operating to cause said member to spring back free of said back catch and when energized and upon such forward unlocking operating to cause said member to spring forward free of said forward catch, a chamber having a movable wall, and means operating when said wall moves a predetermined distance in one direction to energize said spring device and to move said cams back and when said wall moves a predetermined distance in the reverse direction to energize said spring device and to move said cams forward.

44. In combination a movable foot, an outward opposing spring pressing said foot inward, an inward opposing spring device having a spring weaker than said outward opposing spring, means causing said inward opposing spring device to oppose said outward opposing spring when the latter is somewhat relaxed, a movable member, and means connecting said foot and said member whereby an outward movement of said foot in opposition to said outward opposing spring and upon opposing it to a predetermined limit moves said member in one direction and an inward movement of said foot and upon said inward opposing spring device being opposed to a predetermined limit reverses the movement of said member.

45. In combination a movable foot, an outward opposing spring pressing said foot inward, an inward opposing spring device having a spring weaker than said outward opposing spring, means causing said inward opposing spring device to oppose said outward opposing spring when said foot is in position between its inmost position and a position between its inmost and outmost positions, a movable member, and means connecting said foot and said member whereby an outward movement of said foot in opposition to said outward opposing spring and upon opposing it to a predetermined limit moves said member in one direction and an inward movement of said foot and upon said inward opposing spring device being opposed to a predetermined limit reverses the movement of said member.

46. In combination a movable foot, an outward opposing spring pressing said foot inward, a lever movable forward and back, means connecting said foot and said lever whereby an outward movement of said foot moves said lever forward and an inward movement of said foot moves said lever back, an inward opposing spring weaker than said outward opposing spring, and means causing said inward opposing spring to oppose the back movement of said lever when said outward opposing spring is somewhat relaxed.

47. In combination a movable foot, an outward opposing spring pressing said foot inward, a lever movable forward and back, means connecting said foot and said lever whereby an outward movement of said foot moves said lever forward and an inward movement of said foot moves said lever back, an inward opposing spring weaker than said outward opposing spring, and means causing said inward opposing spring to oppose the back movement of said lever when said lever is in positions corresponding to positions of said foot between the inmost position of said foot and a position between its inmost and outmost positions.

48. In combination a movable member having a transverse projection, a locking device having a catch locking said projection on a forward movement of said member and in front of the catch a face on its side toward said member, a cam on being moved back operating on said face so as to unlock said catch from said projection, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to move said cam back and upon such unlocking to move said member back free of said catch and when said foot moves a predetermined distance outward to move said cam and member forward.

49. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to move said cams back and upon such back unlocking to move said member back free of said back catch and when said foot moves a predetermined distance outward to move said cams forward and upon such forward unlocking to move said member forward free of said forward catch.

50. In combination a movable member having a transverse projection, a locking device having a catch locking said projection on a forward movement of said member and in front of the catch a face on its side toward said member, a cam on being moved back operating on said face so as to unlock said catch from said projection, a spring device when energized and upon such unlocking operating to cause said member to spring back free of said catch, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to energize said spring device and to move said cam back and when said foot moves a predetermined distance outward to move said cam and member forward.

51. In combination a movable member having a transverse forward projection and a transverse back projection, a locking device having a forward catch locking said forward projection on a back movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a spring device when energized and upon such back unlocking operating to cause said member to spring back free of said back catch and when energized and upon such forward unlocking operating to cause said member to spring forward free of said forward catch, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to energize said spring device and to move said cams back and when said foot moves a predetermined distance outward to energize said spring device and to move said cams forward.

52. In combination a movable member having a transverse forward projection, a transverse back projection and a central section of reduced diameter, a locking device having a catch locking said projection on a forward movement of said member, having a back catch locking said back projection on a forward movement of said member, having back of the forward catch a forward face on its side toward said member and having in front of the back catch a back face on its side toward said member, a forward cam on being moved forward operating on said forward face so as to unlock said forward catch from said forward projection, a back cam on being moved back operating on said back face so as to unlock said back catch from said back projection, a forward sleeve head surrounding said section back of said forward cam, a back sleeve head surrounding said section in front of said back cam, a helical compression motor spring surrounding said section and bearing against said heads, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to move said cams back and when said foot moves a predetermined distance outward to move said cams forward.

53. In combination a movable member having a transverse forward projection, a transverse back projection and a central section of reduced diameter, a locking device having a catch locking said projection on a forward movement of said member, having a back catch locking said back projection on a forward movement of said member, having back of the forward catch a forward face on its side toward said member and having in front of the back catch a back face on its side toward said member, a double end cam device having a forward cam that on a forward movement of the device operates on said forward face so as to unlock said forward catch from said forward projection, having a back cam that on a back movement of the device operates on said back face so as to unlock said back catch from said back projection and having a rigid connection between said cams, a forward sleeve head surrounding said section back of said forward cam, a back sleeve head surrounding said section in front of said back cam, a helical compression motor spring surrounding said section and bearing against said heads, a movable foot, an outward opposing spring pressing said foot inward, an inward opposing spring weaker than said outward opposing spring, means causing said inward opposing spring to oppose said outward opposing spring when the latter is somewhat relaxed, and means operating when said foot moves a predetermined distance inward to move said device back and when said foot moves a predetermined distance outward to move said device forward.

54. In combination a chamber having a movable wall, a foot upon the outside of said wall, an outward opposing spring pressing said foot against said wall, an inward opposing spring weaker than said outward opposing spring, means causing said inward opposing spring to oppose said outward opposing spring when the latter is somewhat relaxed, a casing inclosing said spring and foot and covering said wall, a rock shaft piercing said casing, means connecting the inner end of said shaft and said foot whereby a movement of said foot rotates said shaft, a movable member, and means connecting the outer end of said shaft and said member whereby an outward movement of said wall in opposition to said outward opposing spring and opposing it to a predetermined limit moves said member in one direction and an inward movement of said wall and upon said inward opposing spring being opposed to a predetermined limit reverses the movement of said member.

55. In combination a chamber having a movable wall, a foot upon the outside of said wall and having a transverse recess, a slide block in said recess, an outward opposing spring pressing said foot against said wall, an inward opposing spring weaker than said outward opposing spring, means causing said inward opposing spring to oppose said outward opposing spring when the latter is somewhat relaxed, a casing inclosing said spring, foot and slide block and covering said wall, a rock shaft piercing said casing, an inner lever secured to the inner end of said shaft and so secured to said slide block that a reciprocating movement of said foot rotates said shaft through the lever, a movable member, and means connecting the outer end of said shaft and said member whereby an outward movement of said wall in opposition to said outward opposing spring and upon opposing it to a predetermined limit moves said member in one direction and an inward movement of said wall and upon said inward opposing spring being opposed to a predetermined limit reverses the movement of said member.

56. In combination a chamber having a movable wall, a foot upon the outside of said wall and having a recess from back to front, a slide block in said recess having a more than semi-cylindrical recess from side to side, an outward opposing spring pressing said foot against said wall, an inward opposing spring weaker than said outward opposing spring, means causing said inward opposing spring to oppose said outward opposing spring when the latter is somewhat relaxed, a casing inclosing said spring, foot and slide block and covering said wall, a rock shaft piercing said casing, an inner lever secured to the inner end of said shaft and having a more than semi-cylindrical free end occupying said more than semi-cylindrical recess, a movable member, and means connecting the outer end of said shaft and said member whereby an outward movement of said wall in opposition to said outward opposing spring and upon opposing it to a predetermined limit moves said member in one direction and an inward movement of said wall and upon said inward opposing spring being opposed to a predetermined limit reverses the movement of said member.

57. In combination a chamber having a movable wall, a foot upon the outside of said wall, an outward opposing spring pressing said foot against said wall, a lever movable forward and back, an inward opposing spring weaker than said outward opposing spring, means causing said inward opposing spring to oppose the back movement of said lever when said outward opposing spring is somewhat relaxed, a casing inclosing said spring and foot and covering said wall, a rock shaft piercing said casing, means connecting the inner end of said shaft and said foot whereby a movement of said foot rotates said shaft, and means connecting the outer end of said shaft and said lever whereby an outward movement of said wall in opposition to said outward opposing spring and upon opposing it to a predetermined limit moves said lever forward and an inward movement of said wall and upon said inward opposing spring being opposed to a predetermined limit moves said lever back.

58. In combination a chamber having a movable wall, a foot upon the outside of said wall and having a transverse recess, a slide block in said recess, an outward opposing spring pressing said foot against said wall, an outer lever movable forward and back, an inward opposing spring weaker than said outward opposing spring, means causing said inward opposing spring to oppose the back movement of said outer lever when said outward opposing spring is somewhat relaxed, a casing inclosing said spring, foot and slide block and covering said wall, a rock shaft piercing said casing, an inner lever secured to the inner end of said shaft and so secured to said slide block that a reciprocating movement of said foot rotates said shaft through the lever, and means connecting the outer end of said shaft and said outer lever whereby an outward movement of said wall in opposition to said outward opposing spring and upon opposing it to a predetermined limit moves said outer lever forward and an inward movement of said wall and upon said inward opposing spring being opposed to a predetermined limit moves said outer lever back.

59. In combination a chamber having a movable wall, a foot upon the outside of said wall and having a recess from back to front, a slide block in said recess having a more than semi-cylindrical recess from side to side, an outward opposing spring pressing said foot against said wall, an outer lever movable forward and back, an inward opposing spring weaker than said outward opposing spring, means causing said inward opposing spring to oppose the back movement of said outer lever when said outward opposing spring is somewhat relaxed, a casing inclosing said spring, foot and slide block and covering said wall, a rock shaft piercing said casing, an inner lever secured to the inner end of said shaft and having a more than semi-cylindrical free end occupying said more than semi-cylindrical recess, and means connecting the outer end of said shaft and said outer lever whereby an outward movement of said wall in opposition to said outward opposing spring and when opposing it to a predetermined limit moves said outer lever forward and an inward opposing spring being opposed to a predetermined limit moves said outer lever back.

60. In combination a thermostatic fluid chamber having a lateral hub with a passage extending from its outer end into said chamber and a plug valve seat in the hub transverse to said passage, a charging plug valve occupying said valve seat and adapted to register with said passage, a diaphragm forming one wall of said chamber, a motor piece outside of said diaphragm, and means whereby an outward movement of said diaphragm moves said piece in one direction and an inward movement of said diaphragm reverses the movement of said piece.

61. In combination a thermostatic fluid chamber having a threaded lateral hub with a passage extending from its outer end into said chamber, a plug valve seat in the hub transverse to said passage and an annular gasket recess around the base of the hub, a gasket in said recess, a charging plug valve occupying said valve seat and adapted to register with said passage, a cap screwing around said hub so as to inclose said valve and to compress said gasket, a diaphragm forming one wall of said chamber, a motor piece outside of said diaphragm, and means whereby an outward movement of said diaphragm moves said piece in one direction and an inward movement of said diaphragm reverses the movement of said piece.

62. In combination a thermostatic fluid chamber having a lateral hub with a passage extending from its outer end into said chamber, a plug valve seat in the hub transverse to said passage and a threaded annular gasket recess around the outer end of said valve seat, a charging plug valve occupying said valve seat, adapted to register with said passage and having its outer end of reduced diameter and slotted, a gasket surrounding said end of reduced diameter and occupying said recess, a slotted ring also surrounding said end of reduced diameter and screwed into said recess so as to compress said gasket, a diaphragm forming one wall of said chamber, a motor piece outside of said diaphragm, and means whereby an outward movement of said diaphragm moves said piece in one direction and an inward movement of said diaphragm reverses the movement of said piece.

63. In combination a thermostatic fluid chamber having a threaded lateral hub with a passage extending from its outer end into said chamber, a plug valve seat in the hub transverse to said passage, a small threaded annular gasket recess around the outer end of the valve seat and a large annular gasket recess around the base of the hub, a large gasket in said large recess, a charging plug valve occupying said valve seat, adapted to register with said passage and having its outer end of reduced diameter and slotted, a small gasket surrounding said end of reduced diameter and occupying said small recess, a slotted ring also surrounding said end of reduced diameter and screwed into said small recess so as to compress said small gasket, a cap screwing around said hub so as to inclose said valve, small gasket and ring and so as to compress said large gasket, a diaphragm forming one wall of said chamber, a motor piece outside of said diaphragm, and means whereby an outward movement of said diaphragm moves said piece in one direction and an inward movement of said diaphragm reverses the movement of said piece.

GEORGE P. CARROLL.
FRANK N. ROEHRICH.

Witnesses:
JOHN E. PRAGER,
FRANK C. HOLBROOK.